United States Patent Office 3,050,398
Patented Aug. 21, 1962

3,050,398
RAPID MATURATION OF ALCOHOLIC
BEVERAGES
Robert B. Carroll, Doubling Road, Greenwich, Conn.
No Drawing. Filed Jan. 4, 1960, Ser. No. 51
9 Claims. (Cl. 99—47)

This invention relates to a process for the rapid maturation of alcoholic beverages, and to the alcoholic beverages which are obtainable by this process.

It is well known that aged alcoholic liquors have a more desirable taste, flavor and aroma than the raw liquors. The freshly distilled liquors contain certain acids, aldehydes and higher alcohols which impart a burning and unpleasant taste. When the liquor is aged for a considerable period of time, usually a matter of many years, in contact with charred wood or charcoal, certain chemical changes take place in the liquor which improve the aroma and give the liquor a milder taste and flavor.

The slowness with which aging brings about these desirable changes has long troubled the alcoholic beverage industry, and a number of methods have been proposed to shorten the time. The patent literature is replete with suggestions, but none of these have ever come into general use, either because they are expensive to carry out and not always consistent in result, or because they run afoul of the statutory requirements for potable alcoholic beverages.

Cox Patent No. 2,036,167 studied the oxidation processes that take place in the freshly distilled liquor, and broke these down into two types, first, and primarily, the oxidation of alcohols to aldehydes and then to acids with the subsequent interaction of the acids with alcohol to form esters, and the second, which occurs in the congeners of the liquor to produce minute quantities of higher aromatic and flavor-producing materials which he claims are responsible for the distinctive bouquet of the aged liquor. Cox tackles this problem by separating the congeners and then oxidizing them, after which they are returned to the liquor. In this way, he seeks to expedite the formation of the aged bouquet and flavor.

Barker No. 2,055,060 accelerates the natural aging process by heating an 80 to 120 proof freshly distilled whiskey in contact with an activated or partly activated charcoal, during which a little air is admitted. Barker claims that in this way in one hour he gets an aging that is equivalent to at least one year.

Merriam No. 2,096,334 distills the wort from the fermenting vats in a continuous still, and the total of light-boiling materials are condensed with the alcohol at a strength of less than 160 proof to form the raw whiskey. This is fractionated to effect further partial separation of aldehydes and alcohols, and a small heads fraction is removed and treated with an acid solution of an oxidizing agent so as to convert the aldehydes and alcohols into organic acids and nonvolatile gums. The organic acids so formed will combine to some extent with the alcohols to form the desirable esters. The thus-treated heads fraction is then returned to the system, and blended with the other desirable distillates. In this way Merriam disposes of undesirable aldehydes, and increases the percentage of the desired esters, with a resulting improvement in the taste, flavor and other characteristics similar to aged beverages.

Reiman No. 2,132,435 seeks to increase the rate of the reactions that normally occur during aging in the barrel by increasing the temperature of the whiskey during the aging process to near, at, or above the boiling point. He thus takes advantage of the increase in rate of a chemical reaction with rise in temperature. Since it is impractical to heat spirits to such temperatures in a wood cask, he places the raw distillate in a metal or glass-lined container, and mixes with it a surface catalyst such as finely-divided char. He then maintains these temperatures until the desired proportion of esters and other materials is obtained, so that the flavor, aroma and taste characteristics of the aged product are imparted to the raw whiskey.

Surprisingly, all of these workers have tackled the aging process by working with the products of the alcoholic fermentation preceding distillation of the raw whiskey. All of these processes treat conventional raw distillates. Such chemical treatments of the distillates, however, are not wholly satisfactory, first, because of the added expense in the processing, and, second, because the processing itself imparts flavors which are different from a naturally aged product. The treatments suggested, while effective to the extent indicated, also upset the balance of the reactions which take place during aging, and this is not undetected in the flavor, taste and aroma of the final product.

In accordance with the instant invention, the rapid maturation of alcoholic beverages is effected by modification of the fermentation stage in the preparation of the beverage.

As is well known, the alcoholic mixture that ultimately is used for distillation, which is called distiller's beer or beer or wort, is prepared from grain by five steps, grinding, cooking, saccharification (conversion), dilution and fermentation. The grain, whose type depends upon the beverage being made, is ground to pass a 10 to 30 mesh screen, so that it can be made into a homogeneous paste. This flour is thoroughly mixed in water, cooked with steam to paste the starch in the flour and facilitate conversion of the starch more rapidly into fermentable sugar, converted into malt at an elevated temperature, of the order of 140 to 144° C. this being initiated by ground malt, and then cooled to a fermentation temperature and fermented. Usually, about 60 to 70% of the starch present in the grain is converted during the saccharification or conversion step, and this takes place within 20 to 60 minutes.

The converted mash or cooker mash which is ready for fermentation has a concentration varying from 30 to 45 gallons of liquid per bushel of grain, the higher concentration, usually from 40 to 45 gallons per bushel, being preferred for making whiskey. Thin screened stillage, the liquid recovered from the still after the alcohol has been removed, is usually used to dilute the converted mash, but water also can be added if desired. From 10 to 15 gallons of thin stillage is ordinarily used for each bushel of grain, and the volume of water or stillage is calculated so that the desired dilution is obtained, taking into account the amount of condensate from steam during cooking and the stillage. The diluted cooker mash ready for fermentation is called a sweet beer.

The process of the invention is applicable to sweet beers and sour beers obtained from any type of grain, for instance, corn, rye, barley, wheat and rice, as well as mashes prepared from sugar cane or molasses.

The alcoholic fermentation of the sweet beer is conventionally carried out using alcohol-producing yeast of the genus Saccharomyces, such as *S. cerevisiae* or *S. ellipsoidae*. A controlled alcoholic fermentation is carried out by addition of a sufficient amount of the starter yeast culture. The yeast grown in the beer, multiplies rapidly, and produces alcohol by the action of the enzyme zymase. All of this is conventional and well known, and forms no part of the instant invention.

Fermentation is initiated usually with addition of from 2 to 3% by volume of the beer of ripe yeast, and the fermentation takes place in from two to four days and proceeds in three distinctive phases. There is first the incubation period, during which the yeast cells multiply from the starter culture from an initial approximately 6 million to about 100 million or more per ml. of liquid.

During the second period the greatest part of the sugar is fermented to alcohol and carbon dioxide, and in the third phase the remaining dextrins are converted to fermentable sugars and fermented to alcohol. The first and last phases are very slow, but the second phase is quite rapid.

The temperature of the fermenting beer is kept close to the optimum for the species of yeast used, usually within the range from 80 to 86° F. The maximum temperature tolerated by the yeast species used is about 92° F., and the minimum temperature may be as low as 66° F.

In accordance with the instant invention, this fermentation process is modified by incorporating in the fermentation mash in addition to the yeast cells, cells of an organism which is capable of fermenting sugar to ethyl acetate. A typical organism of this type is *Penicillium digitatum*, which produces both ethyl acetate and ethyl alcohol. These molds and like organisms can be grown in the same fermentation or medium as Saccharomyces yeast or *Torula utilis* or *Aspergillus niger*, although temperatures in the upper portion of the yeast operative range are preferred because these organisms grow better in a little warmer medium. Also, it is desirable to deaerate the medium with $CO_2$. The amount of *Pencillium digitatum* or other organism that is added for this purpose depends upon the proportion of ethyl acetate desired in the final product, and is not critical. For most purposes, approximately 1/10 to 1/1000 of the amount of yeast added will be adequate since the organisms grow at about the same rate. The fermentation requires from two to four days.

Following completion of the fermentation, the fermented wort or distiller's beer, which contains besides the alcohol a quite satisfactory proportion of ethyl acetate and the desirable secondary fermentation products, as well as fermentation byproducts, is subjected to distillation to separate the alcohol, ethyl acetate and other volatile byproducts desired in the beverage. Any of the conventional techniques known to those skilled in this art can be used, such as single distillation, double distillation, fractional distillation, columns to separate out fractions of various secondary products, which are then recombined or blended as desired, and fractionation in low pressure fractionating columns all can be employed. The residue from the distillation, which is designated stillage or slop, contains a number of nutrient materials which can be recovered by spray drying or other conventional methods for use as an ingredient in animal feed mixtures. This residue is particularly rich in vitamins, especially riboflavin and other components of the B complex.

The distillate, which is usually called a high wine or an entry whiskey, has a head start in the aging process because of its quite high ethyl acetate concentration. Depending of course upon the organism used and its amount, the ethyl acetate concentration ranges from about 250 to about 500 parts per million, comparable to a four to six year old whiskey. If this raw product is aged in the conventional way in charred wood casks for some two to six years, there is obtained a whiskey comparable to a six to twelve year old whiskey in taste, flavor, and aroma, because of the high ethyl acetate content of the entry whiskey. Surprisingly, it has been found that the high ethyl acetate content is sufficient to give the raw product the characteristics of an aged whiskey. The low (due to shorter term aging) content of the higher esters, that is, esters of higher acids and higher alcohols, apparently does not detract from these characteristics in the final product, despite contrary assertions in the literature emphasizing their importance.

The following examples in the opinion of the inventor represent the best embodiments of his invention:

*Example 1*

A diluted bourbon cooker mash was prepared from a mixture of 250 parts distilled water, 75 parts corn meal, 25 parts maltex, 10 parts *Saachaormyces cerevisiae* (Fleischmann's brewer's yeast) and 0.01 part of *Penicillium digitatum* spores (several billion), with a pinch of potassium dihydrogen phosphate and potassium monohydrogen phosphate as a buffer. This was incubated at 90° F. for three days. The wort was then distilled to recover the alcohol, ethyl acetate and other components to obtain a bourbon entry whiskey. The product had an ethyl acetate content of from 250 to 500 p.p.m. corresponding to that of a four to six year old bourdon. This product can replace a normally aged four to six year old whiskey, and will be identical thereto because of the higher content of ethyl acetate. The product can be aged in the normal way, and will retain this four to six year lead on further aging over an older product, aged the same period of time.

For example, this entry whiskey is filled in charred Missouri white oak barrels and stored for six months to two years. In the course of storage, the odor of yeast and penicillium fermentation mash is removed, and the color of a true bourbon is acquired. The aged bourbon has the flavor, aroma and taste of a four and one-half to eight year old bourbon, and the ethyl acetate content ranges from 375 to 750 p.p.m.

*Example 2*

A rye entry whiskey was prepared from a mash composed of 250 parts distilled water, 70 parts rye meal, 20 parts maltex, 36 parts corn meal, 10 parts *Saccharomyces cerevisiae* and 0.01 part *Penicillium digitatum* spores, with a pinch of potassium dihydrogen phosphate and potassium monohydrogen phosphate as a buffer. This mash was incubated at 90° F. for four days, after which the alcohol and codistillable products were separated by distillation in a pot still. The distillate was an entry rye whiskey having an ethyl acetate content equal to a six to eight year old rye whiskey, ranging from 350 to 600 p.p.m.

This product can replace a normally aged six to eight year old whiskey, and will be identical thereto because of the higher content of ethyl acetate. The product can be aged in the normal way and will retain the six to eight year lead on an older product aged the same period of time. This entry whiskey is put in charred Missouri white oak barrels and stored for two years, at the end of which time the rye has the taste, flavor and aroma of an eight to ten year old rye whiskey.

*Example 3*

An entry rum was prepared from a sugar cane molasses mash having the composition: 250 parts distilled water, 250 parts molasses, 10 parts maltex, 10 parts *Saccharomyces cerevisiae*, and 0.01 part *Penicillium digitatum*, with one part concentrated sulfuric acid and a pinch of potassium dihydrogen phosphate and potassium monohydrogen phosphate buffer. This mash was incubated at 90° F. for four days and then distilled. The distillate was an entry rum having an ethyl acetate content equivalent to a four year old rum, 400 p.p.m. The product can be aged in the normal way, and will retain this four to six year lead on further aging over an older product, aged the same period of time.

For example, to the entry rum is added some caramelized raw sugar to the desired color and flavor, and the rum then is aged in uncharred oak barrels or vats for one year. The product then is equivalent in flavor to a five year old rum in taste, flavor and aroma, due to the initial high ethyl acetate content.

*Example 4*

Example 3 was repeated, substituting grape juice for the molasses. Similar results were obtained.

The entry brandy is aged in white oak barrels for two years. The product is equivalent to a five year old grape brandy in taste, flavor and aroma, due to the high ethyl acetate content.

*Example 5*

Example 3 was repeated, substituting apple cider for the molasses. Similar results were obtained.

The entry brandy is aged in white oak barrels for two years. The product is equivalent to a five year old apple brandy in taste, flavor and aroma, due to the high ethyl acetate content.

I claim:
1. A process for the rapid maturation of alcoholic beverages by preparing a high ethyl acetate beer, which comprises cofermenting a beer with a yeast strain capable of fermenting carbohydrates to alcohol and a Penicillium variety capable of fermenting carbohydrates to ethyl acetate, and distilling the alcohol content in the resulting feremented wort.
2. A process in accordance with claim 1, which comprises aging the distillate in a selected wood to further increase the ethyl acetate content and improve the taste, flavor and aroma.
3. A process in accordance with claim 1, in which the yeast is *Saccharomyces cerevisiae* and the Penicillium is *Penicillium digitatum*.
4. A process in accordance with claim 1, in which the yeast is *Saccharomyces ellipsoidae* and the Penicillium is *Penicillium digitatum*.
5. A process in accordance with claim 1, in which the beer is a bourbon mash.
6. A process in accordance with claim 1 in which the beer is a rye mash.
7. A process in accordance with claim 1 in which the beer is a molasses mash.
8. A process in accordance with claim 1 in which the beer is a grape juice mash.
9. A process in accordance with claim 1 in which the beer is an apple cider mash.

References Cited in the file of this patent

UNITED STATES PATENTS

| | | |
|---|---|---|
| 2,291,009 | Underkofler | July 22, 1942 |
| 2,356,218 | Christensen | Aug. 22, 1944 |

OTHER REFERENCES

Textbook; "A Manual of the Penicillia," by K. B. Raper and Charles Thom, published, 1949, by The Williams and Wilkins Company, Baltimore, Md., pages 385 to 392.